UNITED STATES PATENT OFFICE.

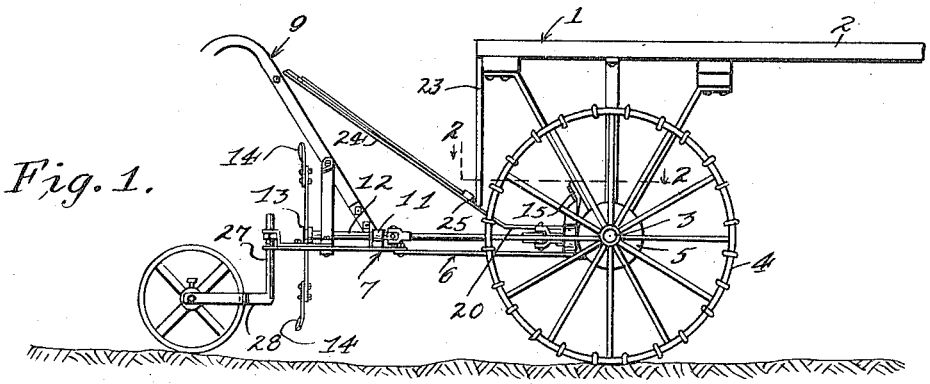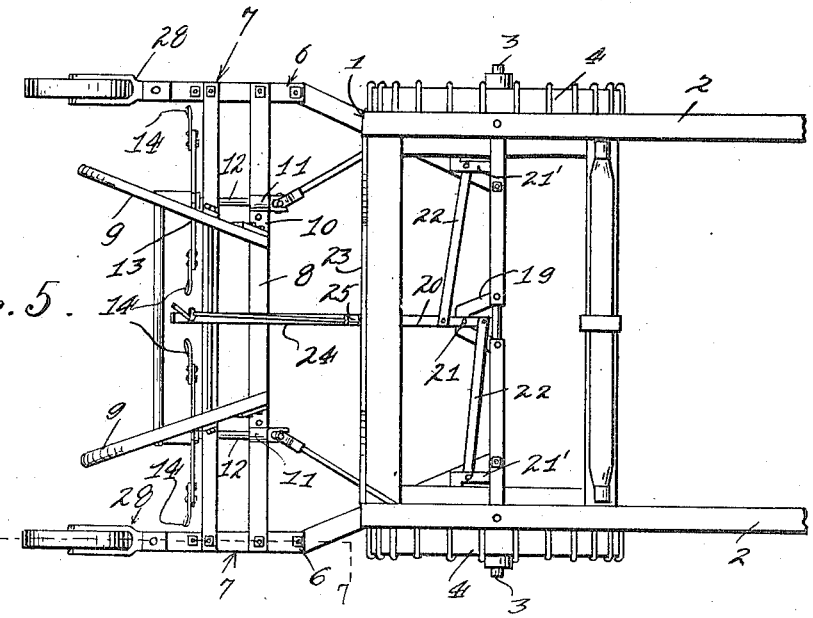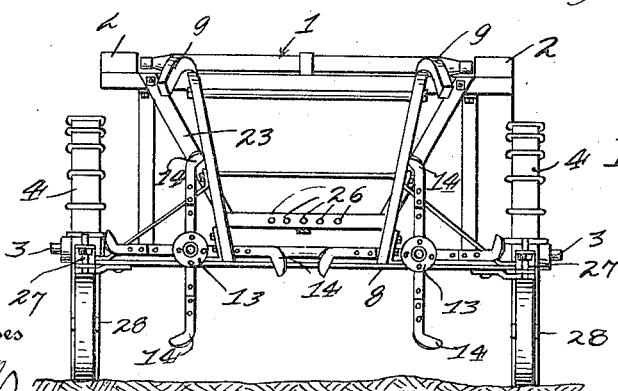

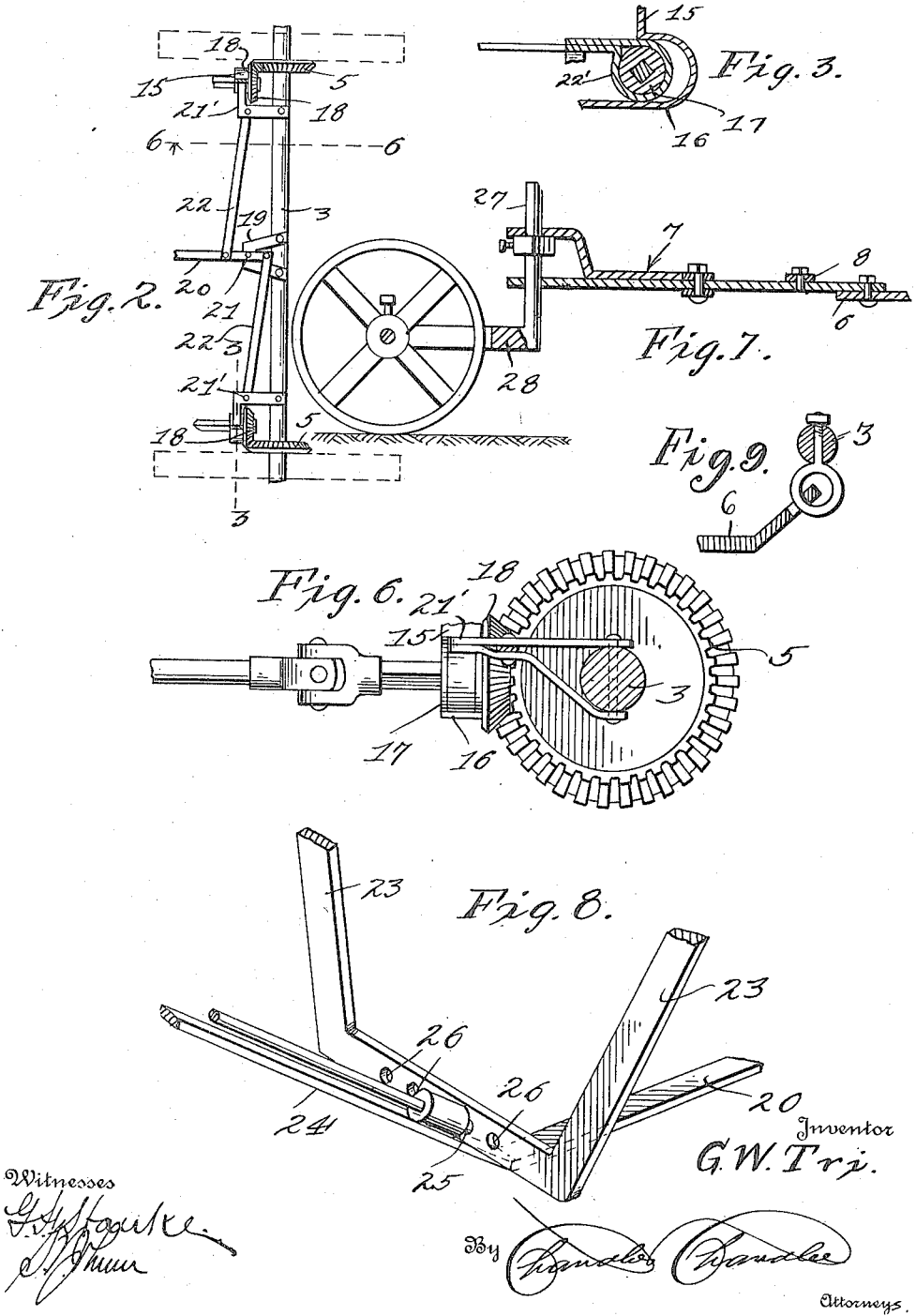

GEORGE WM. TRI, OF ZUMBROTA, MINNESOTA.

BEET-BLOCKING MACHINE.

1,197,243.  Specification of Letters Patent.  Patented Sept. 5, 1916.

Application filed December 9, 1915. Serial No. 65,937.

*To all whom it may concern:*

Be it known that I, GEORGE W. TRI, a citizen of the United States, residing at Zumbrota, in the county of Goodhue, State of Minnesota, have invented certain new and useful Improvements in Beet-Blocking Machines; and I do hereby declare the following to be a full, clear, and exact description of the invention, such as will enable others skilled in the art to which it appertains to make and use the same.

The present invention is directed to improvements in machines for blocking beet plants, and has for its object to provide a machine of this character so constructed that the cutting blades can be simultaneously thrown in or out of operation.

A further object of the invention is to provide a beet blocking machine, so constructed that a pair of rows of beets can be blocked during the movement of the machine across the field.

A still further object of the invention is to provide novel means for operating the cutting blades, and to regulate the cutting action thereof, whereby the machine may be used in blocking beets of various growth.

With these and other objects in view, this invention resides in the novel features of construction, formation, combination and arrangement of parts to be hereinafter more fully described, claimed and illustrated in the accompanying drawing, in which:—

Figure 1 is a side elevation of the machine. Fig. 2 is a sectional view on line 2—2 of Fig. 1. Fig. 3 is a sectional view on line 3—3 of Fig. 2. Fig. 4 is a rear elevation of the machine. Fig. 5 is a top plan view of the machine. Fig. 6 is a sectional view on line 6—6 of Fig. 2. Fig. 7 is a sectional view on the line 7—7 of Fig. 5. Fig. 8 is a fragmentary perspective view of the hanger. Fig. 9 is a detail sectional view showing how the sectional side bars are connected to the axle.

Referring to the drawing 1 indicates a frame, the upper end of which supports the shafts 2, and supported by the lower end of the frame is the axle 3, on the ends of which are rotatably mounted the ground wheels 4. Fixed to the wheels 4 are beveled gears 5, the purpose of which will appear later.

Pivotally connected to the axle 3 are the forward ends of the sectional side bars 6, of the frame 7, said frame having fixed to the cross bar 8 thereof, the lower ends of the handles 9. The handles 9 are fixed to the cross bar 8 by the metal strips 10, which have their lower ends provided with sleeves 11 for rotatably receiving the flexible shafts 12, to the rear ends of which are fixed disks 13, said disks being provided with cutting blades 14.

Supported by the frame 1 are brackets 15, the lower ends of which are provided with elongated bearings 16, and in which are engaged the hub 17 of the beveled gears 18, said gears being adapted to mesh with the gears 5, during the operation of the machine.

Carried by the axle 3 is a bracket 19, which pivotally supports the extension 20, said lever having pivotally connected upon opposite sides of its pivot bolt 21, the inner ends of the links 22, the outer ends of which are pivotally connected to the angle levers 21', which in turn are pivotally connected to the axle 3, whereby when the lever is oscillated the links will be moved to either cause the beveled gears 18 to engage or disengage the gears 5 since said levers are provided with sleeves 22', which rotatably engage the hubs 17. Also supported by the frame 1 is a hanger 23, under which slides the lower end of the hand lever 24, the lower end of which is integrally connected to the rear end of the extension 20. The lever 24 is adapted to engage a selected opening 26 formed in said hanger, so as to hold the gears 18 and 5 in mesh or out of mesh, as desired.

Adjustably connected to the rear ends of the side bars 6 are the spindles 27 of the caster wheel supporting frames 28. By adjustably mounting the spindles 27, it is obvious that the cutting action of the blades 14 may be regulated.

From the foregoing description it will be seen that when the machine is drawn across the field, that rotary movement will be imparted to the shafts 12 so as to rapidly rotate the disks 13, whereby the blade will engage the growing beets, thereby blocking or thinning the rows.

What is claimed is:—

A beet blocker comprising a frame, a wheeled supporting axle associated with the frame, brackets carried by the frame and having their lower ends provided with elongated bearings, a second frame having its side bars pivotally connected at their forward ends to the axle, a cross bar connecting the bars of the second frame, handles having strips secured to their lower ends and connected to the cross bar, said strips terminating in sleeves, flexible shafts extending longitudinally of the second frame, and having their forward ends provided with beveled gears, said gears having hubs adapted to slidably engage said bearings, said shafts being journaled in said sleeves, and having disks fixed to their rear ends and provided with cutting blades, beveled gears associated with the wheels, and means for shifting the first named gears into or out of engagement with the last named gears, as and for the purpose set forth.

In testimony whereof, I affix my signature in the presence of two witnesses.

GEORGE WM. TRI.

Witnesses:
A. F. LIFFRIG,
JOHN W. ALMETER.

Copies of this patent may be obtained for five cents each, by addressing the "Commissioner of Patents, Washington, D. C."